(12) United States Patent
Youkhana et al.

(10) Patent No.: US 11,827,079 B2
(45) Date of Patent: Nov. 28, 2023

(54) CLASS A SURFACE RADIANT HEATING SYSTEM

(71) Applicant: GM GLOBAL TECHNOLOGY OPERATIONS LLC, Detroit, MI (US)

(72) Inventors: Oumta G. Youkhana, Macomb, MI (US); Michael S. Demianenko, Canton, MI (US); Kuo-huey Chen, Troy, MI (US); Rami Z. Sayed, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 628 days.

(21) Appl. No.: 17/070,296

(22) Filed: Oct. 14, 2020

(65) Prior Publication Data

US 2022/0111703 A1 Apr. 14, 2022

(51) Int. Cl.
*B60H 1/22* (2006.01)
*H05B 3/34* (2006.01)
(Continued)

(52) U.S. Cl.
CPC ......... *B60H 1/2218* (2013.01); *B60H 1/2226* (2019.05); *B60Q 9/00* (2013.01); *H05B 1/0277* (2013.01); *H05B 3/06* (2013.01); *H05B 3/145* (2013.01); *H05B 3/16* (2013.01); *H05B 3/347* (2013.01); *H05B 3/54* (2013.01); *F24F 2110/10* (2018.01); *F24F 2120/12* (2018.01); *F24F 2130/00* (2018.01); *F24F 2221/10* (2013.01); *F24F 2221/20* (2013.01); *H05B 2203/005* (2013.01); *H05B 2203/015* (2013.01); *H05B 2203/016* (2013.01)

(58) Field of Classification Search
CPC .. B60H 1/2218; B60H 1/2226; B60H 1/2227; B60H 1/2215; B60H 1/00285; B60H 1/00295; H05B 1/0238; H05B 1/0272; H05B 1/0277; H05B 3/347; H05B 2203/015; F24F 2221/10; F24F 2120/12; F24F 2130/00; F24F 2110/10
See application file for complete search history.

(56) References Cited

U.S. PATENT DOCUMENTS 5,422,462 A * 6/1995 Kishimoto ........... H05B 1/0272
219/545
6,222,162 B1 * 4/2001 Keane ..................... H05B 3/34
219/505
(Continued)

FOREIGN PATENT DOCUMENTS

CA 3048438 A1 * 1/2020 ............... B26B 5/00
CN 106676747 A * 5/2017 ............... D04B 1/14
(Continued)

*Primary Examiner* — Steven B McAllister
*Assistant Examiner* — Daniel E. Namay
(74) *Attorney, Agent, or Firm* — Lorenz & Kopf LLP

(57) ABSTRACT

Radiant heating systems for warming an occupant of an enclosed space. The system includes a component with a surface that faces the occupant. The surface defines an A-surface quality meaning the surface is visible and is designed with styling objectives to have an aesthetic appearance. Conductive strands are exposed at the surface and a power supply supplies electric power to the conductive strands. A controller controls the electric power supplied to the conductive strands.

20 Claims, 7 Drawing Sheets

(51) Int. Cl.
  *H05B 3/14*   (2006.01)
  *H05B 3/16*   (2006.01)
  *H05B 3/54*   (2006.01)
  *H05B 3/06*   (2006.01)
  *B60Q 9/00*   (2006.01)
  *H05B 1/02*   (2006.01)
  *F24F 120/12*   (2018.01)
  *F24F 110/10*   (2018.01)
  *F24F 130/00*   (2018.01)

(56) References Cited

U.S. PATENT DOCUMENTS

| | | | | |
|---|---|---|---|---|
| 7,974,526 | B2 * | 7/2011 | Chu | F24H 3/002 |
| | | | | 392/419 |
| 10,493,995 | B2 | 12/2019 | Chen et al. | |
| 2005/0067402 | A1 * | 3/2005 | Green | D03D 13/006 |
| | | | | 219/515 |
| 2005/0173414 | A1 * | 8/2005 | Ishii | H01C 1/1406 |
| | | | | 219/505 |
| 2009/0214194 | A1 * | 8/2009 | Chu | F24H 9/2071 |
| | | | | 392/419 |
| 2011/0047957 | A1 * | 3/2011 | Richard | D03D 15/25 |
| | | | | 57/1 R |
| 2012/0199080 | A1 * | 8/2012 | Siddons | A01K 1/033 |
| | | | | 119/448 |
| 2018/0176989 | A1 * | 6/2018 | Hu | B32B 7/12 |
| 2018/0370637 | A1 * | 12/2018 | Hu | H05B 3/286 |
| 2019/0193660 | A1 * | 6/2019 | Alexander | D04B 1/12 |
| 2019/0315372 | A1 * | 10/2019 | Chen | B60H 1/2226 |
| 2019/0320503 | A1 | 10/2019 | Han et al. | |
| 2020/0346516 | A1 * | 11/2020 | Yen | B60H 1/00742 |

FOREIGN PATENT DOCUMENTS

| | | | | |
|---|---|---|---|---|
| DE | 202006017337 U1 * | 4/2007 | | H05B 3/347 |
| DE | 102008047291 A1 * | 4/2010 | | B60H 1/00271 |
| DE | 102019109361 A1 * | 10/2019 | | B60H 1/00735 |
| JP | H06295780 A * | 4/1993 | | H05B 1/0272 |
| JP | 2011246091 A * | 12/2011 | | B60H 1/00849 |
| JP | 2016085958 A * | 5/2016 | | B60H 1/22 |

\* cited by examiner

CLASS A SURFACE RADIANT HEATING SYSTEM

INTRODUCTION

The present disclosure generally relates to the use of radiant heating for controlling the temperature of an enclosed space, and more particularly relates to radiant heating systems with components that have a class A surface (A-surface) formed by the heating system.

The development of HVAC systems that deliver adequate thermal comfort at lower cost and higher efficiency is a challenge. Providing a comfortable environment for occupants of a space typically involves conditioning through the use of climate control such as through a heating, ventilating and air conditioning (HVAC) system. Providing a HVAC system enables maintaining a comfortable environment for occupants by adding or removing heat from the space. The HVAC system therefore works to counter unwanted heat or cold. Such systems often have a time lag between start-up and achieving a desirable comfort level, particularly when a space has been unheated for an extended period of time. When heat loss or infiltration occurs or when surrounding components are at a low temperature, an occupant feels cold and the HVAC system only indirectly addresses those sources by warming internal air. In addition, forced air type systems generate sound when in operation, which may be undesirable.

The surfaces that contribute to a cold feeling include A-surfaces. An A-surface is a product's visible surface designed with styling objectives to have an aesthetic appearance. The A-surface of a component generally has a smoothly contoured side that is visible to the human eye after the part is assembled to present a surface with curvature continuity. The A-surface may have a selected texture, and is generally free of features such as ribs, die marks, irregularities, etcetera. Maintaining the appearance of an A-surface is preferred.

In vehicle applications, the current powertrain trends indicate that as engines become more fuel-efficient, the amount of waste heat from these engines is significantly reduced. This creates additional challenges in providing thermal comfort for vehicle occupants, especially during the cold-soak, warm-up phase of vehicle operation. The issue becomes further challenging for vehicles with alternative powertrains such as hybrid and electric vehicles, as there is little to no waste heat from internal combustion engines. Therefore, in certain applications a HVAC system may have an undesirably long response time or a limited capacity for space heating. In other applications there is a preference to reduce energy usage of a HVAC system. In other applications, providing additional heating options is desirable. In addition, HVAC systems do not directly address cold soaked components with A-surfaces.

Accordingly, it is desirable to provide systems and methods that efficiently, quickly and quietly provide heating for a broad range of applications. Furthermore, other desirable features and characteristics of systems for thermal control of an enclosed space will become apparent from the subsequent detailed description and the appended claims, taken in conjunction with the accompanying drawings and the foregoing introduction.

SUMMARY

Radiant heating systems are provided using A-surface generated heat. In a number of embodiments, a radiant heating system for warming an occupant of an enclosed space includes a component with a layer forming a surface that faces the occupant. The surface has an A-surface quality, meaning the surface is visible and is designed with styling objectives to have an aesthetic appearance. Conductive strands are exposed at the surface. A power supply supplies electric power to the conductive strands, and a controller controls the electric power supplied to the conductive strands.

In an additional embodiment, a sensor monitors proximity to the component. The controller controls the supply of electric power based on the proximity.

In an additional embodiment, the controller interrupts the electric power when the occupant approaches touching the component as determined by monitoring the sensor.

In an additional embodiment, the controller interrupts the electric power only when a temperature of the surface is greater than eighty-degrees Celsius.

In an additional embodiment, the controller operates the conductive strands up to approximately 130° Celsius.

In an additional embodiment, the surface is comprised of a fabric with nonconductive strands interwoven with the conductive strands.

In an additional embodiment, conductive terminals are coupled with the conductive strands and are interwoven with the nonconductive strands.

In an additional embodiment, the conductive strands each comprise a nonconductive core yarn surrounded by a conductive casing.

In an additional embodiment, the conductive casing comprises carbon fibers.

In an additional embodiment, the controller sets the electric power to zero when a desired temperature of the surface is sixty-degrees Celsius or lower.

In a number of additional embodiments, a radiant heating system for warming an occupant of an enclosed space includes a component with a layer having a surface that faces the occupant. The surface has an A-surface quality meaning the surface is visible and is designed with styling objectives to have an aesthetic appearance. The surface is defined by a fabric material with conductive strands embedded in the fabric material and exposed at the surface. A power supply delivers electric power to the conductive strands.

In an additional embodiment, a heating, ventilation and air conditioning (HVAC) system conditions the enclosed space to a set temperature. A controller controls the electric power supplied to the conductive strands and controls the HVAC system. The power supply and the HVAC system are controlled in coordination based on the set temperature.

In an additional embodiment, a sensor monitors proximity to the component. The controller controls the supply of electric power based on the proximity and interrupts the electric power when the occupant approaches contact with the component, as determined by monitoring the sensor.

In an additional embodiment, the controller interrupts the electric power only when a temperature of the surface is greater than eighty-degrees Celsius.

In an additional embodiment, the controller operates the conductive strands up to approximately 130° Celsius so that the surface heats to 130° Celsius.

In an additional embodiment, the fabric material includes nonconductive strands interwoven with the conductive strands.

In an additional embodiment, conductive terminals are coupled with the conductive strands, with the power supply, and are interwoven in the fabric material.

In an additional embodiment, the conductive strands each include a nonconductive core yarn to provide strength to the fabric material. The nonconductive core yarn is surrounded by a conductive casing to conduct electricity.

In an additional embodiment, the conductive casing includes carbon fibers and the core yarn includes polymer fibers.

In additional embodiments, a radiant heating system for warming an occupant of an enclosed space includes a component with a surface that faces the occupant. The surface has an A-surface quality meaning the surface is visible and is designed with styling objectives to have an aesthetic appearance. The surface is defined by a fabric material with conductive strands embedded in the fabric material and exposed at the surface. Nonconductive strands are interwoven with the conductive strands. A power supply supplies electric power to the conductive strands. A controller controls the electric power supplied to the conductive strands.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
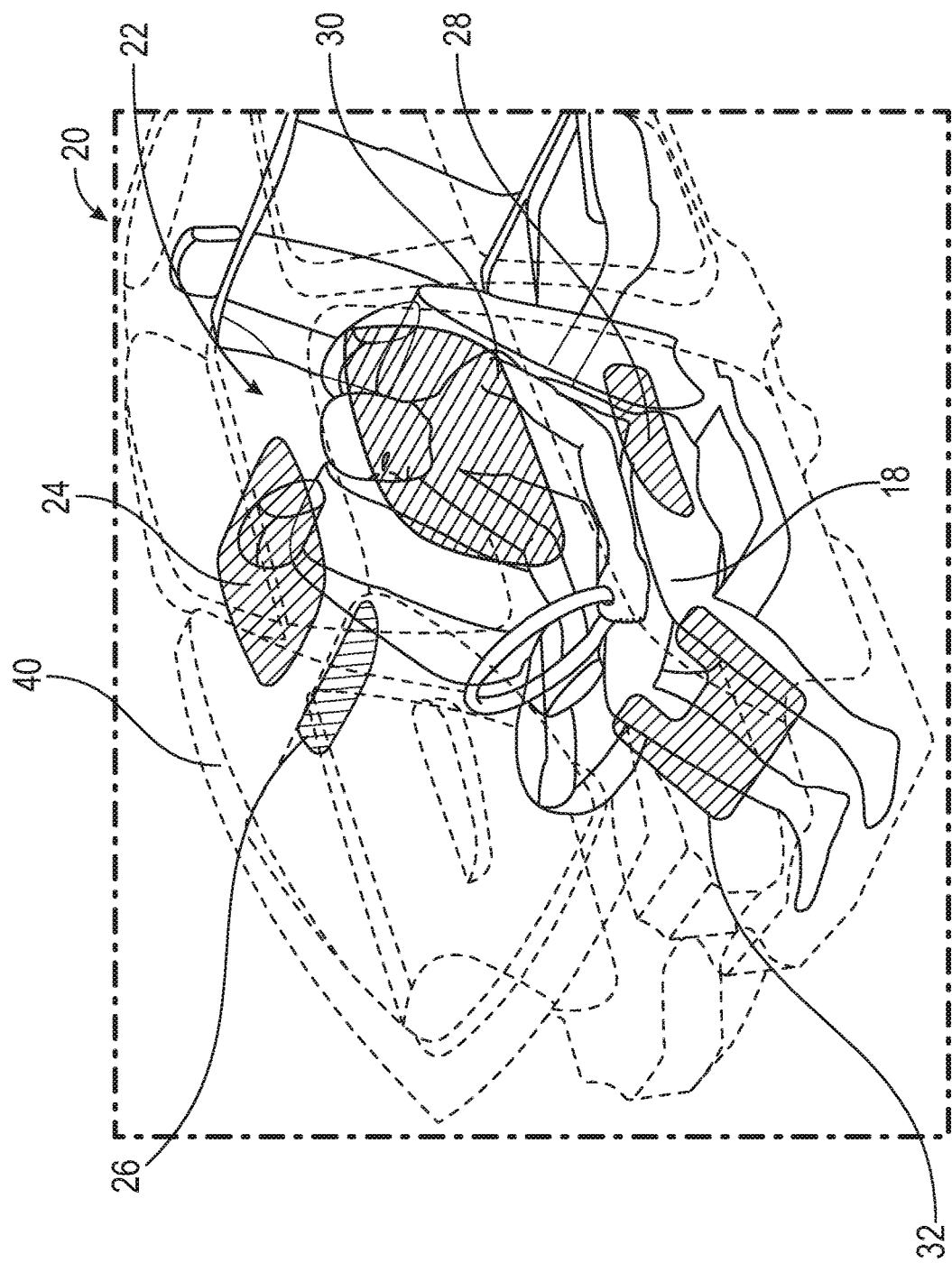
FIG. 1 is a schematic illustration of a vehicle including an A-surface radiant heating system, in accordance with various embodiments.

The following detailed description is merely exemplary in nature and is not intended to limit the application or its uses. Furthermore, there is no intention to be bound by any expressed or implied theory presented in the preceding technical field, introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As described in more detail below, radiant materials are implemented in the interior A-surfaces of an enclosed space such as the occupant compartment of a motor vehicle. Fast occupant thermal comfort is achieved through nearly instantaneous radiant heat at low power consumption. The A-surface radiant heating system may target specific occupant body segments based on view factors between the radiant materials and occupant body segments. Multiple components may be implemented with A-surface radiant heating to deliver optimal occupant thermal comfort at an efficient power consumption rate. Surface temperatures of the components may be controlled to deliver effective radiant heat and to avoid undesirable heat exposure.

FIG. 1 illustrates a device for housing occupant(s) 18 in an enclosed space, according to an exemplary embodiment. In the current example, the device is a vehicle 20 and specifically is a ground vehicle such as an automobile of any one of a number of different types. In other embodiments, the vehicle 20 may be a plane, boat, another type of mobile device, or a stationary structure such as a building or container. As described in greater detail below, the vehicle 20 includes an A-surface radiant heating system 22 with radiant heating components 24, 26, 28, 30, 32 that produce radiant heat for increasing the comfort level of occupant(s) 18 of the vehicle 20. In the current embodiment, the component 24 is a headliner, the component 26 is a sun visor, the component 28 is an interior door panel, the component 30 is a deployable window shade, and the component 32 is a dash panel. It will be appreciated that the widow shade/component 30 may only be implemented on non-driver windows, but is illustrated on the driver widow to show the desired positioning and effect vis-a-vis the occupant 18. In various embodiments, any number of the components 24, 26, 28, 30, 32 and/or other components of the vehicle 20 may be implemented with A-surface radiant heating.

Figure 2:
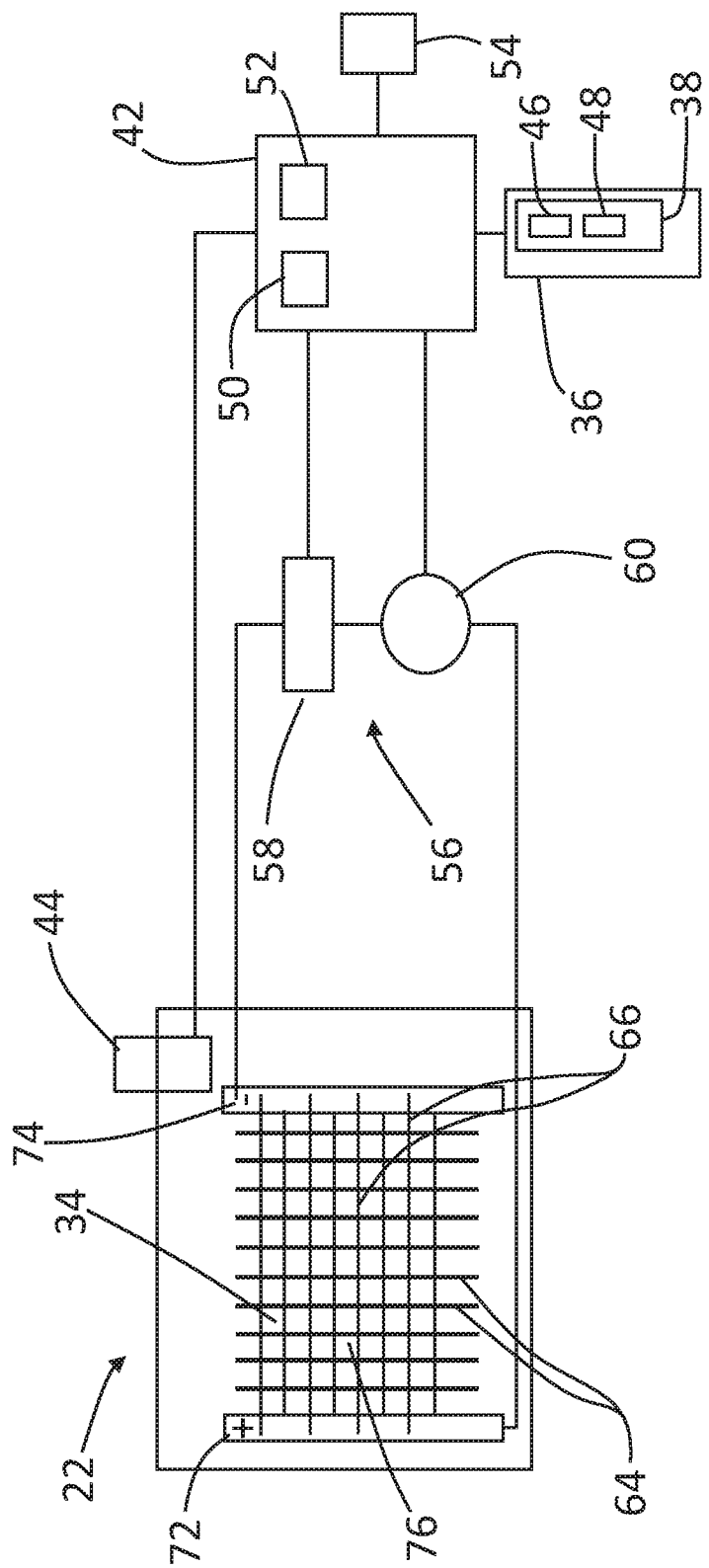
FIG. 2 is a schematic illustration of part of the A-surface radiant heating system of the vehicle of FIG. 1, in accordance with various embodiments.

Referring additionally to FIG. 2, the A-surface radiant heating system 22 in general, receives inputs from sources on-board the vehicle 20, processes the inputs, and provides outputs to effect heat output. In the depicted embodiment, the A-surface radiant heating system 22 generally includes, or cooperates with, an HVAC system 36, which includes an operator interface 38. It will be appreciated that the number of A-surface radiant heating components 24, 26, 28, 30, 32, etc. implemented in the system 22 will vary and any number of individual components may be positioned and/or activated to provide heat to any number of occupants 18. For example, additional radiant heating materials may be positioned to provide radiant heat to the right, front seat passenger and/or the rear seat passengers. Advantageously, the A-surface radiant heat components 24, 26, 28, 30, 32, etc., may substantially be the standard interior trim components of the vehicle designed and fabricated to have a desired aesthetic appearance, including contour and texture, as modified according to the current disclosure. To provide the desired appearance, the respective components include a visible, occupant facing A-surface comprising a material section 34.

The vehicle 20 generally includes a body 40 defining a space that substantially encloses components of the vehicle 20, including any occupant(s) 18. The vehicle 20 includes various vehicle systems that are controlled by one or more controller(s) 42. These vehicle systems include the A-surface radiant heating system 22 and the HVAC system 36. The A-surface radiant heating system 22 includes a sensor suite 44 communicatively coupled with the controller(s) 42 for measuring parameters such as temperatures of external ambient air outside the vehicle 20, cabin air temperature inside the cabin of the vehicle 20, temperature of the material section 34, occupant proximity to the material section 34, and/or others. The sensor suite 44 provides signals and/or other information to the controller(s) 42 to discern the monitored parameters.

An operator interface 38 is provided, such as in the instrument panel of the vehicle 20, or at another location appropriate for the application, and may include operator controls 46, 48. The operator interface 38 is communicatively coupled with the controller(s) 42 and provides signals and/or other information thereto with regard to selections made by the occupant 18. The signals include information from which the controller(s) 42 discern a temperature setting desired by occupants 18 such as the driver and front passenger of a vehicle via control 46, including for operation of the A-surface radiant heating system 22. The operator interface 38 also include the control 48, such as one or more buttons to activate/deactivate all or some of the A-surface radiant heating components 24, 26, 28, 30, 32. In a number of examples, instead of buttons, for the controls 46, 48, the operator interface 38 may comprise one or more sensors associated with user interfaces such as vehicle touch screens, rotary knobs, and/or other types of user interfaces within the vehicle 20 for receiving inputs from the occupant 18.

While the components of the A-surface radiant heating system 22 are depicted as being part of the same system, it will be appreciated that in certain embodiments these features may comprise multiple modules or systems. In addition, in various embodiments the A-surface radiant heating system 22 may comprise all or part of, and/or may be coupled to, various other vehicle devices and systems, such as, among others, the HVAC system 36, and/or one or more other systems of the vehicle 20.

The controller(s) 42 accept information from the various sources, processes that information, and provides control commands based thereon to effect outcomes such as operation of the vehicle 20 and its systems, including the A-surface radiant heating system 22 and the HVAC system 36. In the depicted embodiment, the controller(s) 42 includes various modules such as a processor 50 and a memory device 52, and is coupled with a storage device 54. The processor 50 performs the computation and control functions of the controller(s) 42, and may comprise any type of processor or multiple processors, single integrated circuits such as a microprocessor, or any suitable number of integrated circuit devices and/or circuit boards working in cooperation to accomplish the functions of a processing unit. During operation, the processor 50 executes one or more programs that may be contained within the storage device 54 and, as such, controls the general operation of the controller(s) 42, generally in executing the operations described herein.

The memory device 52 may be any type of suitable memory. For example, the memory device 52 may include volatile and nonvolatile storage in read-only memory (ROM), random-access memory (RAM), and keep-alive memory (KAM), for example. KAM is a persistent or non-volatile memory that may be used to store various operating variables while the processor 50 is powered down. The memory device 52 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller(s) 42. In the depicted embodiment, the storage device 54 stores the above-referenced programs along with one or more stored values.

The storage device 54 stores data for use in automatically controlling the aspects of the vehicle 20 and its systems, including the A-surface radiant heating system 22. The storage device 54 may be any suitable type of storage apparatus, including direct access storage devices such as hard disk drives, flash systems, floppy disk drives and optical disk drives. In one exemplary embodiment, the storage device 54 comprises a source from which the memory device 52 receives the programs that execute one or more embodiments of one or more operations of the present disclosure, such as the steps of processes (and any sub-processes thereof) described herein. In another exemplary embodiment, a program may be directly stored in and/or otherwise accessed by the memory device 52. The programs represent executable instructions, used by the electronic controller(s) 42 in processing information and in controlling aspects of the vehicle 20 and its systems. The instructions may include one or more separate programs, each of which comprises an ordered listing of executable instructions for implementing logical functions. The instructions, when executed by the processor 50 support the receipt and processing of signals such as from sensors, perform logic, calculations, methods and/or algorithms for automatically controlling various aspects of the components and systems of the vehicle 20. The processor 50 may generate control signals for the A-surface radiant heating system 22 and/or the HVAC system 36 for automatic control based on the logic, calculations, methods, and/or algorithms.

Methods, algorithms, or parts thereof may be implemented in a computer program product of the controller(s) 42 including instructions or calculations carried on a computer readable medium for use by one or more processors to implement one or more of the method steps or instructions. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

In a number of embodiments, the controller(s) 42 produce signals for delivery to a power supply 56 that includes a power source 58, and may set the operational state thereof such as on/off state by selectively delivering a supply of power when heating by the A-surface radiant heating system is desired. For example, a feed from the electrical system of the vehicle 20 may be used as the power source 58 and may be switched on when desired. The controller(s) 42 produce signals that are delivered to a regulator 60 of the power supply 56 to set the power supply level delivered to the material section 34. For example, the regulator 60 may provide voltage regulation via pulse-width modulation (PWM) control to control the amount of power delivered to the material section 34 and therefore to control the heat radiated. In response to the supplied power, the material section 34 provides an instantaneous warm thermal sensation to the occupant 18. Heating output may be controlled as a function of sensed environmental temperature, giving maximum heat at lower temperature and reducing heat output and power use as temperature rises and/or as the capacity of the HVAC system 36 to deliver heat increases. For example, the power source 58 and the regulator 60 are controlled to supply current with PWM control at 0% for a cabin/external air temperature above an upper threshold and 100% for the cabin/external air temperature below a lower threshold temperature. Between the upper and lower threshold temperatures, PWM is varied in relation to the desired control temperature with more power supplied at lower temperatures. The surface temperatures of the material section 34 is set by varying the power supplied to improve occupant thermal comfort of the occupant 18. The surface temperature target may be generated by the controller(s) 42 based on data and algorithms stored in the storage device 54.

The material section 34 may be a layer that covers the entire occupant facing surface of any of the components 24, 26, 28, 30, 32, or any portion of the surface. The material section 34 is a fabric type material that is weaved/knitted or otherwise formed, and that is directly exposed to the occupant 18 and that includes the radiant heating elements exposed at the A-surface. The material section 34 may be constructed, such as by weaving to provide the desired A-surface appearance and may be any of a variety of colors and textures. For example, a set of warp strands designated as nonconductive strands 64 may be aligned and stretched and then a set of weft strands, designated as conductive strands 66 may be introduced across the warp strands and alternated at various intervals either in front of or behind a row or rows of warp strands. In the current embodiment, the warp/nonconductive strands 64 comprise a nonconductive material selected for its strength, appearance, and durability and may be made of natural or synthetic fibers. Examples include polyethylene terephthalate, polybutyrate, aliphatic polyamide, semi-aromatic polyamide, polyacrylonitrile, cotton, and combinations thereof, although a wide range of fiber materials may be used depending on the characteristics desired. In the current example, the weft/conductive strands 66 comprise a conductive material selected for its ability to conduct electricity and generate heat. In other embodiments, the conductive strands 66 may be used as the warp strands and the nonconductive strands 64 may be used as the weft strands. In additional embodiments, the conductive strands 66 may be intermingled with nonconductive strands 64 in either or both of the respective warp or weft strand set. The weaved/knitted strands that comprise the heating A-surface are designed into recognizable/desirable patterns of the fabric material for interior feature enhancement of the components 24, 26, 28, 30, 32.

Figure 3:
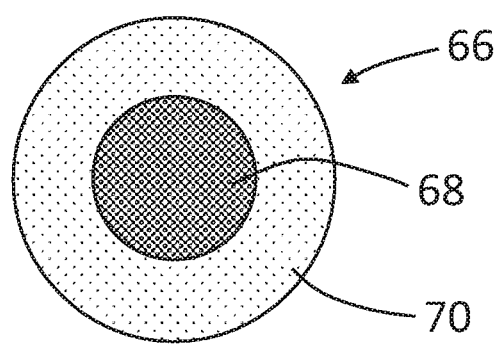
FIG. 3 is a cross section of a heating element of the A-surface radiant heating system FIG. 2, in accordance with various embodiments.

A cross section of one conductive strand 66 is illustrated in FIG. 3, to which additional reference is directed. In general, fibers of a given material, or group of materials, are transformed into strands of yarn. In this case, the center of the conductive strand 66 may comprise a core yarn 68. The core yarn 68 may be made of the same material as the nonconductive strands 64, such as synthetic polymer or natural fibers, or may be another non-conductive material selected to provide the desired characteristics to the conductive strand 66, such as strength and durability. The core yarn 68 is covered with a conductive annular section or casing 70 to form the conductive strands 66. Examples used in the casing 70 include carbon fibers or a composite of carbon and other fibers. Other types of conductive materials may be used such as metal or other types of conductive threads.

As shown in FIG. 2, a set of terminals 72, 74 is provided for supplying power to the conductive strands 66. In this embodiment, the terminal 72 is a positive terminal and the terminal 74 is a negative terminal and the two are coupled with the power supply 56 including the power source 58 and the regulator 60. The terminals 72, 74 comprise conductive metallic threads or strips woven into the fabric of the material section 34 and are coupled at opposite ends of the conductive strands 66. When heat is desired from the material section 34, power is supplied through the terminals 72, 74 and the conductive strands 66 heat up and radiate heat. Heating density/intensity may be tailored based on the number of conductive strands 66 provided within a given area of the material section 34. The conductive strands 66 are themselves uncovered, to the extent allowed by the weave, at the exposed surface 76, and therefore efficiently project heat toward the occupant 18. Accordingly, the weaved fabric of the material section 34 itself serves as both a heater and as an appearance and wear surface 76 of the component 24, 26, 28, 30, 32 with no cover over the heating elements of the conductive strands 66. Substantial radiant heat is generated by the conductive strands 66 by supplying sufficient power to achieve a temperature in the conductive strands 66 of approximately 130 degrees Celsius.

Figure 4:
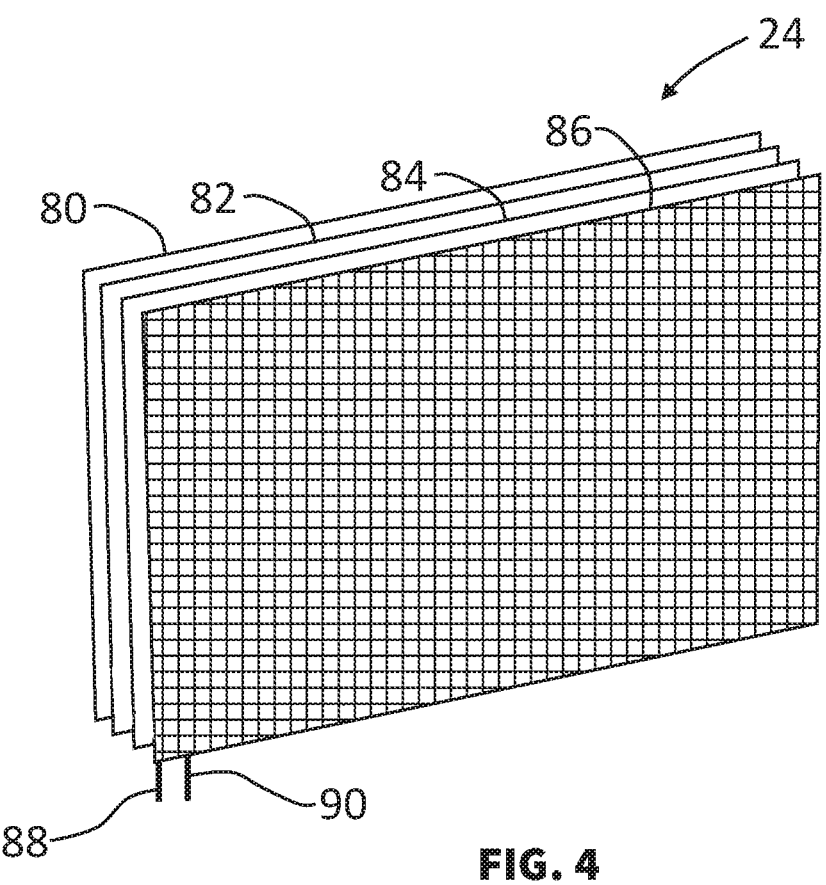
FIG. 4 is a schematic illustration of a section of a multi-layer A-surface radiant heating device of FIG. 1, in accordance with various embodiments.

Referring to FIG. 4, an example of the component 24, which comprises a headliner is shown. The component 24 includes a headliner substrate 80 formed with the structural characteristics desired, in the dimensions to fit the application, and with the contours desired. An insulation layer 82 is provided adjacent and across the headliner substrate 80 to reduce heat loss and inhibit heat conduction away from the occupant 18. A reflective layer 84, such as of mylar, metal, or another reflective material, is disposed adjacent and across the insulation layer 82 to reflect heat toward the occupant 18. An A-surface radiant heating layer 86, such as comprising the strands 64, 66 is disposed over the reflective layer 84 and is exposed to the occupant 18. The A-surface radiant heating layer 86 is supplied with power through electrical leads 88, 90.

Figure 5:
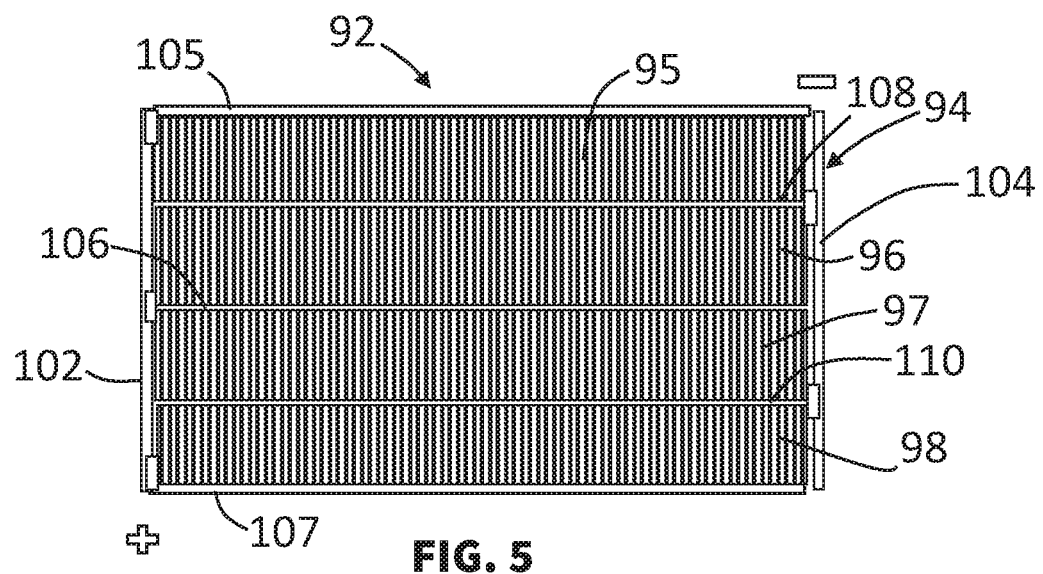
FIG. 5 is a schematic plan view illustration of a section of an A-surface radiant heating device of FIG. 1, in accordance with various embodiments.
Figure 6:
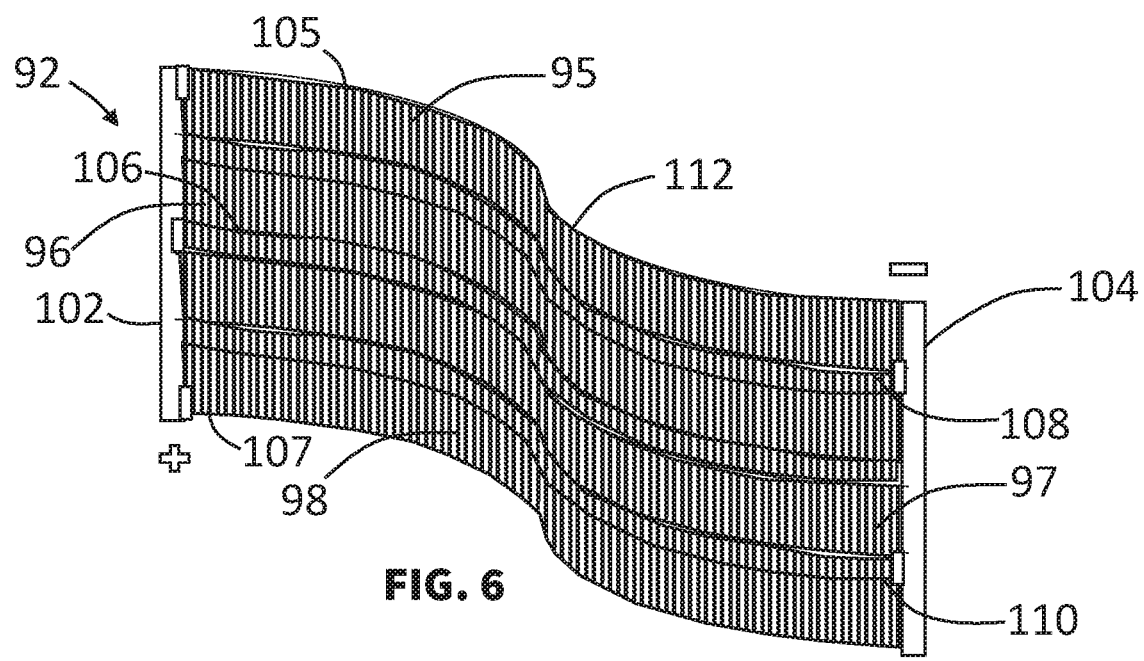
FIG. 6 is a schematic illustration of a section of a contoured A-surface radiant heating device of FIG. 1, in accordance with various embodiments.

Referring to FIG. 5, a zone control capability is established by the electrical distribution system 92 of the material section 94. In this embodiment, the material section 94 includes four zones 95-98. Power is supplied to the material section 94 by the positive terminal 102 and by the negative terminal 104. The positive terminal 102 is coupled with positive feeds 105-107 and the negative terminal 104 is coupled with negative feeds 108, 110. In this way, all zones 95-98 are supplied with electrical power. In a number of embodiments, controls may be provided to independently control the zones 95-98. FIG. 6 demonstrates that the material section 94 may be used to cover a component having a contoured shape 112, such as any interior component of the vehicle 20.

Figure 7:
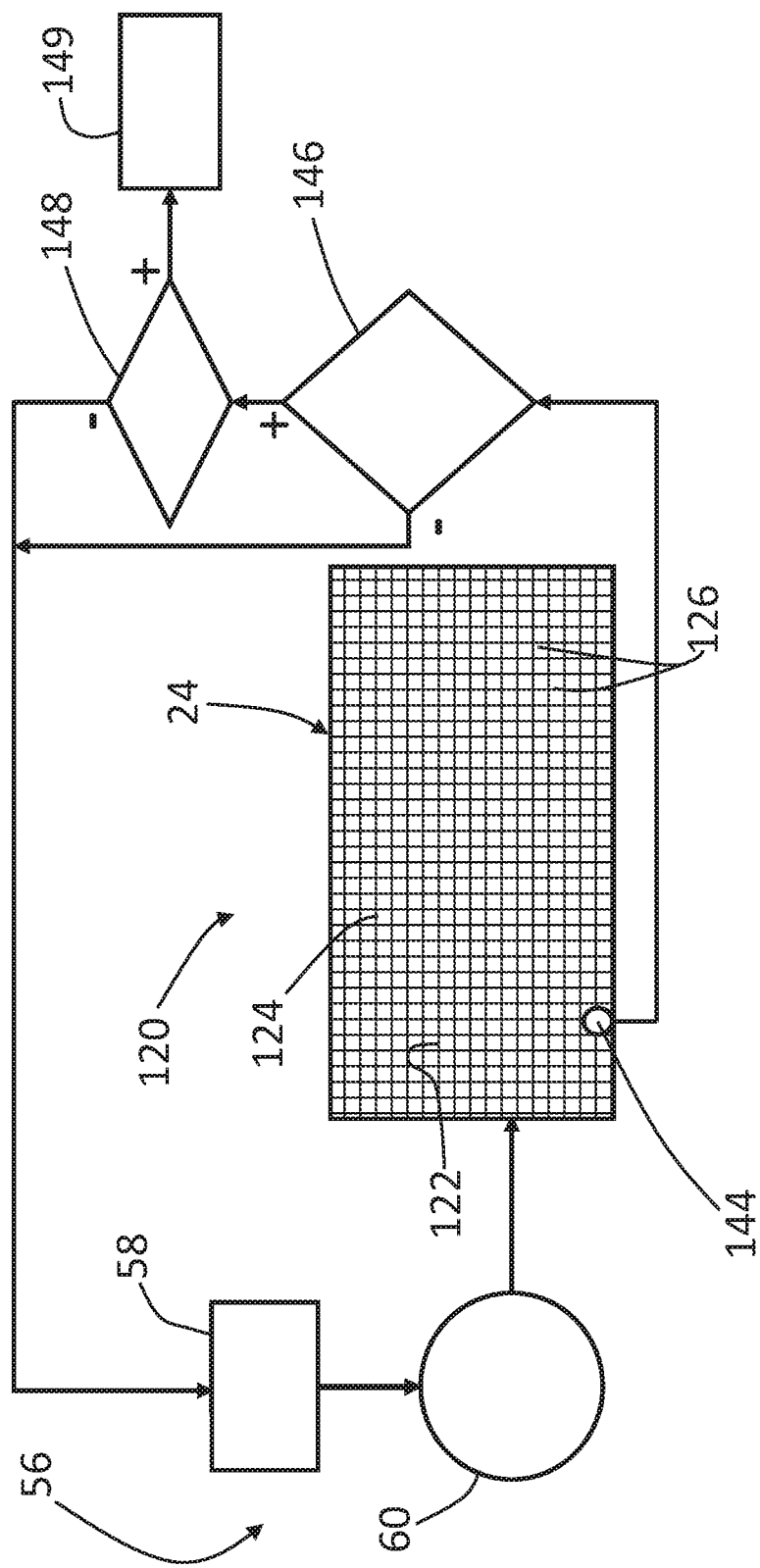
FIG. 7 is a diagram of temperature control for the A-surface radiant heating system of FIG. 2, in accordance with various embodiments.
Figure 8:
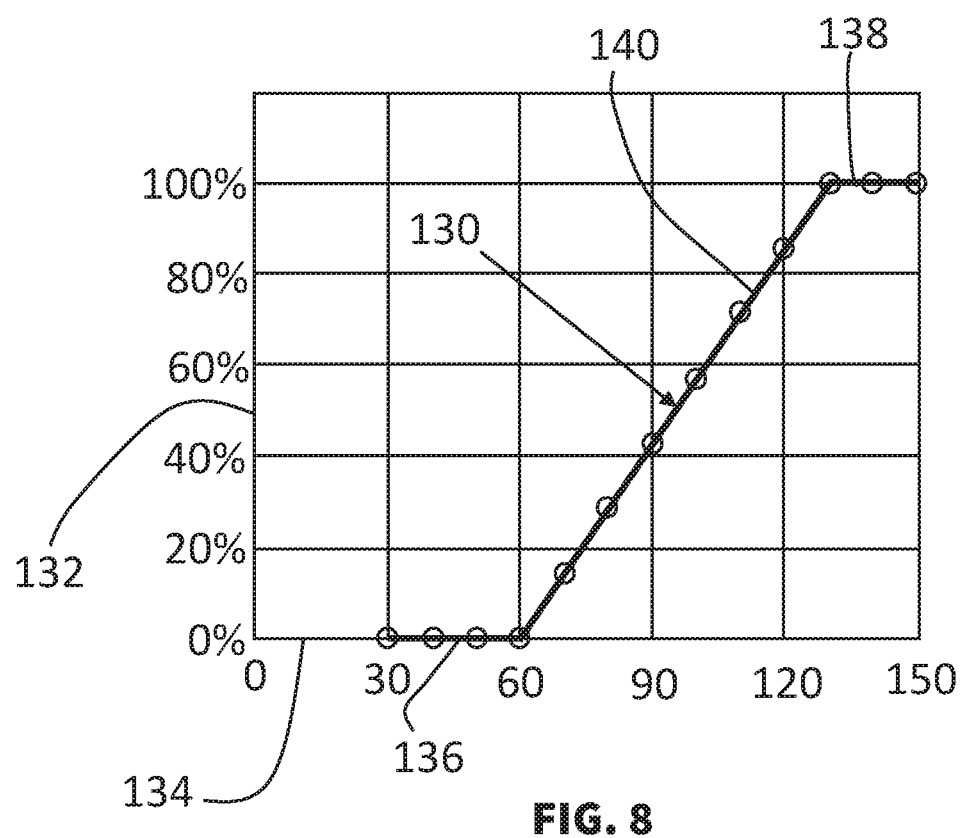
FIG. 8 is a graph of pulse-width modulation percentage versus fabric temperature in degrees Celsius for control of power supply to an A-surface radiant heating device of FIG. 1, in accordance with various embodiments.

Referring to FIG. 7, a control diagram 120 of the A-surface radiant heating system 22 is illustrated, which may be entirely or at least partially carried out by the controller(s) 42. In this example, the component 24 is included as exemplary of any of the components 24, 26, 28, 30, 32, etcetera. The component 24 includes an occupant facing surface 122 of a layer of fabric 124 with conductive strands 126. The component 24 is supplied by the power supply 56 including the power source 58 and the regulator 60. The power supplied to the component 24 and specifically to the conductive strands 126 is variable, such as by using a PWM signal. FIG. 8 illustrates an example of PWM control via the curve 130 with PWM percentage shown on the vertical axis 132 and surface temperature shown on the horizontal axis 134. When a target control temperature of the component 24, such as determined by a control algorithm in the controller(s) 42, is 60° Celsius or lower, the PWM signal is set to zero-percent at the curve segment 136, meaning power supply to the conductive strands 126 is off. When a target control temperature of the component 24 is 130° Celsius or higher, the PWM signal is set to one-hundred-percent at the curve segment 138, meaning power supply to the conductive strands 126 is fully on. When the target temperature is between 60° Celsius and 130° Celsius, the PWM signal is set by the controller(s) 42, at the respective point along a linearly increasing range of percentages at the curve segment 140.

With power supplied to the conductive strands 126, heat is generated and radiated toward the occupant 18. To radiate a desirable amount of heat, temperatures reaching approximately 130° Celsius are generated. This level of temperature may feel uncomfortable to the touch, such as during a prolonged exposure. Accordingly, the sensor suite 44 includes a number of sensor(s) 144 monitoring the component 24. It will be appreciated that due to the size of a headliner, plural sensors 144 may be included to monitor zones of the component 24. The sensor(s) 144 are configured to determine when the occupant 18 is about to touch or is touching the component 24. For example, the sensor(s) 144 may be touch sensors that generate a signal in response to touch applied to the component 24 and may operate on capacitance, resistance or piezio switching properties. Some of these sensors 144 may be embodied as short-rage proximity sensors. The sensor(s) 144 may be another type of proximity sensor such as those that emit a beam or field and monitor for disturbances. The sensor(s) 144 are monitored and a determination 146 is periodically made by the controller(s) 42 as to whether the occupant is about to touch and/or is touching the component 24. When the outcome of the determination 146 is no/negative, the power level supplied to the component 24 continues uninterrupted. When the outcome of the determination 146 is yes/positive, a further determination 148 is made as to whether the set temperature of the conductive strands is above 80° Celsius. When the outcome of the determination 148 is no/negative, the power level supplied to the component 24 continues uninterrupted. When the outcome of the determination 148 is yes/positive, the power supplied to the conductive strands 126 is interrupted/stopped 149, such as until the sensor(s) 144 indicate the occupant 18 has moved away from the component 24.

Figure 9:
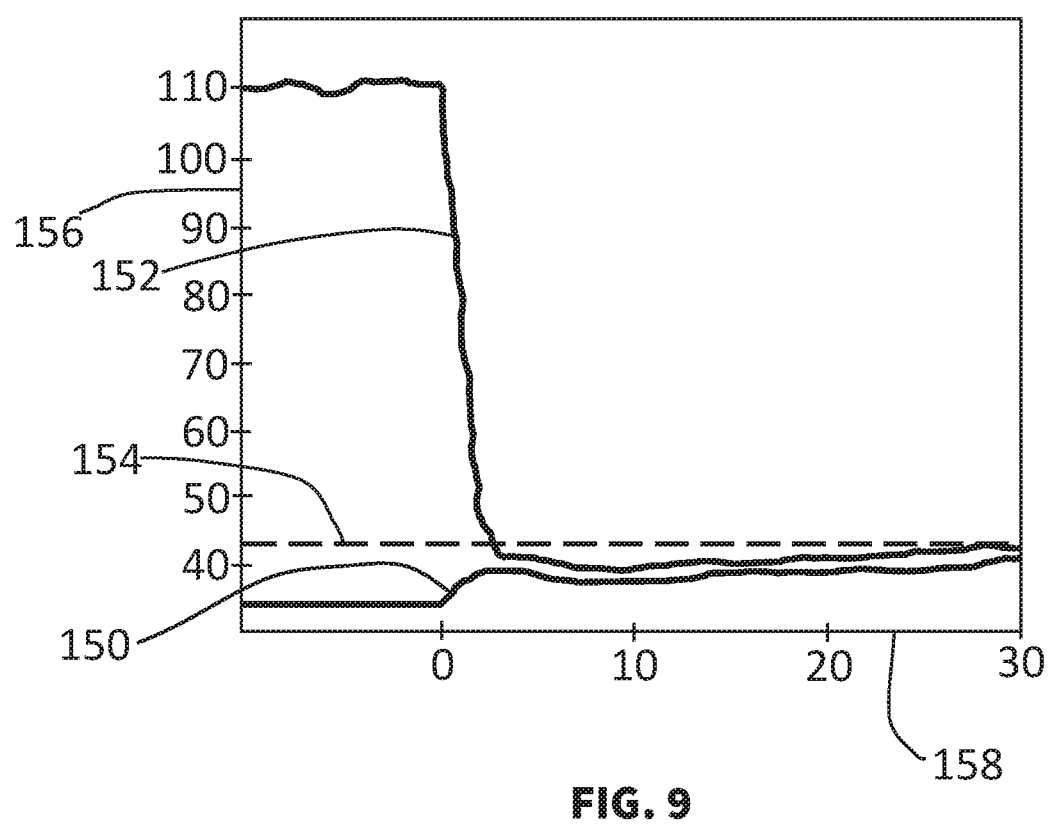
FIG. 9 is a graph of temperature versus time for the temperature controlled A-surface radiant heating system of FIG. 7, and of movement of an occupant toward the A-surface, in accordance with various embodiments.

The graph of FIG. 9 illustrates both movement of the occupant 18 toward the component 24 in curve 150, and temperature versus time of the conductive strands 126 in curve 152. The vertical axis 156 represents temperature of the fabric 124 in degrees Celsius for purposes of curve 152 and also represents distance (without units), from the occupant 18, for example their hand, to the fabric 124 for purposes of curve 150. The horizontal axis 158 represents time in seconds. The reference line 154 indicates both the surface of the fabric 124, which the occupant 18 may approach, and the target temperature for the fabric 124 when the occupant 18 does approach. The curve 150 indicates a closing proximity of the occupant 18 to the surface/reference line 154 following time zero. In response, because the temperature of the fabric 124 is 110° Celsius, which is greater than 80° Celsius, the power supplied to the conductive strands 126 is suspended at time zero and the temperature drops as indicated by curve 152. The temperature drops below the target of 42° Celsius within a time frame of 2-3 seconds, avoiding discomfort from any actual contact between the occupant 18 and the component 24. In an embodiment, the sensor(s) 144 and controller(s) 42 may be configured to trigger a temperature reduction when the distance between the occupant 18 and the component 24 closes to 2-5 millimeters. In other embodiments, the triggering distance may vary, such as depending on the current temperature of the fabric 124, and in some embodiments may be zero millimeters.

Accordingly, multi-zone targeted heating using radiative heat transfer is provided to an occupant directly from the A-surface of surrounding components. When efficient and/or rapid warming of an occupant is needed, the A-surface radiant heating system provides an effective solution. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A radiant heating system for warming an occupant of an enclosed space, the system comprising:
  a component configured to define a part of the enclosed space with a surface configured to face the occupant, the surface comprising an A-surface quality meaning the surface is visible and has a contour and a texture for a desired appearance;
  conductive strands in the component and exposed to the enclosed space at the surface, the conductive strands configured to act as heating elements that are not covered, and as a part of the desired appearance of the surface;

a power supply configured to supply electric power to the conductive strands; and a controller configured to control the electric power supplied to the conductive strands.

2. The system of claim 1, comprising a sensor monitoring proximity to the conductive strands, wherein the controller is configured to control the supply of electric power based on the proximity.

3. The system of claim 2, wherein the controller is configured to interrupt the electric power when the occupant approaches touching the component at the surface as determined by monitoring the sensor.

4. The system of claim 3, wherein the controller is configured to interrupt the electric power only when a temperature of the surface is greater than eighty-degrees Celsius.

5. The system of claim 1, wherein the controller is configured to operate the conductive strands up to a maximum of approximately 130° Celsius.

6. The system of claim 1, wherein the surface is comprised of a fabric material configured as both a heater and as an appearance and a wear surface of the component.

7. The system of claim 6, comprising conductive terminals coupled with the conductive strands and interwoven with the nonconductive strands.

8. The system of claim 1, wherein the conductive strands each comprise a nonconductive core yarn surrounded by a conductive casing.

9. The system of claim 8, wherein the conductive casing comprises carbon fibers.

10. The system of claim 1, wherein the controller is configured to set the electric power to zero when a desired temperature of the surface is sixty-degrees Celsius or lower.

11. A radiant heating system for warming an occupant of an enclosed space, the system comprising:

a component configured to define a part of the enclosed space with a layer having a surface configured to face the occupant, the surface comprising an A-surface quality meaning the surface is visible and is designed with styling objectives to have an aesthetic appearance, wherein the surface is defined by a fabric material that comprises the layer;

conductive strands comprising a part of the component and embedded in the fabric material and exposed at the surface to the enclosed space, the conductive strands configured as heating elements that uncovered, and configured as a part of the aesthetic appearance of the surface; and a power supply configured to supply electric power to the conductive strands.

12. The system of claim 11, comprising:

a heating, ventilation and air conditioning (HVAC) system configured to condition the enclosed space to a set temperature; and a controller configured to:

control the electric power supplied to the conductive strands; and control the HVAC system, wherein the power supply and the HVAC system are controlled in coordination based on the set temperature.

13. The system of claim 11, comprising a sensor monitoring proximity to the conductive strands, wherein the controller is configured to:

control the supply of electric power based on the proximity; and interrupt the electric power when the occupant approaches contact with the component at the surface as determined by monitoring the sensor.

14. The system of claim 13, wherein the controller is configured to interrupt the electric power only when a temperature of the surface is greater than a reference temperature and the occupant is within a reference distance from the surface.

15. The system of claim 11, wherein the controller is configured to operate the conductive strands up to approximately 130° Celsius so that the surface heats to 130° Celsius.

16. The system of claim 11, wherein the fabric material comprises nonconductive strands interwoven with the conductive strands.

17. The system of claim 16, comprising conductive terminals coupled with the conductive strands and with the power supply and interwoven in the fabric material.

18. The system of claim 1, wherein the conductive strands each comprise a nonconductive core yarn configured to provide strength to the fabric material, the nonconductive core yarn surrounded by a conductive casing configured to conduct electricity.

19. The system of claim 18, wherein the conductive casing comprises carbon fibers and the core yarn comprises polymer fibers.

20. A radiant heating system for warming an occupant of an enclosed space, the system comprising:

a component configured to define a part of the enclosed space with a surface configured to face the occupant, the surface comprising an A-surface quality meaning the surface is visible and has a contour and a texture for a desired appearance, wherein the surface is defined by a fabric material;

conductive strands embedded in the fabric material of the component and exposed to the enclosed space at the surface, the conductive strands configured to act as uncovered heating elements, and as a part of the desired appearance of the surface;

nonconductive strands interwoven with the conductive strands;

a power supply configured to supply electric power to the conductive strands; and a controller configured to control the electric power supplied to the conductive strands.

* * * * *